(12) United States Patent
Sainath et al.

(10) Patent No.: US 9,646,634 B2
(45) Date of Patent: May 9, 2017

(54) LOW-RANK HIDDEN INPUT LAYER FOR SPEECH RECOGNITION NEURAL NETWORK

(71) Applicant: Google Inc., Mountain View, CA (US)

(72) Inventors: Tara N. Sainath, Jersey City, NJ (US); Maria Carolina Parada San Martin, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 179 days.

(21) Appl. No.: 14/616,881

(22) Filed: Feb. 9, 2015

(65) Prior Publication Data

US 2016/0092766 A1    Mar. 31, 2016

Related U.S. Application Data

(60) Provisional application No. 62/057,599, filed on Sep. 30, 2014.

(51) Int. Cl.
*G06N 3/04*  (2006.01)
*G10L 25/30*  (2013.01)
*G10L 15/06*  (2013.01)

(52) U.S. Cl.
CPC ........... *G10L 25/30* (2013.01); *G06N 3/0454* (2013.01); *G06N 3/0481* (2013.01); *G10L 15/063* (2013.01)

(58) Field of Classification Search
None
See application file for complete search history.

(56) References Cited

U.S. PATENT DOCUMENTS

| | | | | | |
|---|---|---|---|---|---|
| 5,842,163 | A | * | 11/1998 | Weintraub | G10L 15/10 704/231 |
| 8,918,352 | B2 | * | 12/2014 | Deng | G06N 3/08 382/157 |
| 9,099,083 | B2 | * | 8/2015 | Deng | G10L 15/063 |

(Continued)

OTHER PUBLICATIONS

Lee, H-y, et al. "Graph-based Re-ranking using Acoustic Feature Similarity between Search Results for Spoken Term Detection on Low-resource Languages". Interspeech 2014, Sep. 14-18, 2014. pp. 2479-2483.*

(Continued)

*Primary Examiner* — Stanley K Hill
*Assistant Examiner* — Benjamin Buss
(74) *Attorney, Agent, or Firm* — Fish & Richardson P.C.

(57) ABSTRACT

Methods, systems, and apparatus, including computer programs encoded on computer storage media, for training a deep neural network. One of the methods for training a deep neural network that includes a low rank hidden input layer and an adjoining hidden layer, the low rank hidden input layer including a first matrix A and a second matrix B with dimensions i×m and m×o, respectively, to identify a keyword includes receiving a feature vector including i values that represent features of an audio signal encoding an utterance, determining, using the low rank hidden input layer, an output vector including o values using the feature vector, determining, using the adjoining hidden layer, another vector using the output vector, determining a confidence score that indicates whether the utterance includes the keyword using the other vector, and adjusting weights for the low rank hidden input layer using the confidence score.

18 Claims, 8 Drawing Sheets

(56) References Cited

U.S. PATENT DOCUMENTS

| | | | | |
|---|---|---|---|---|
| 9,202,462 | B2* | 12/2015 | Parada San Martin | G10L 15/02 |
| 2003/0236664 | A1* | 12/2003 | Sharma | G10L 15/08 |
| | | | | 704/251 |
| 2014/0019388 | A1* | 1/2014 | Kingsbury | G06N 99/005 |
| | | | | 706/12 |
| 2014/0156575 | A1* | 6/2014 | Sainath | G06N 7/005 |
| | | | | 706/16 |
| 2015/0127594 | A1* | 5/2015 | Parada San Martin | G06N 3/0454 |
| | | | | 706/16 |
| 2015/0161522 | A1* | 6/2015 | Saon | G06N 3/08 |
| | | | | 706/12 |
| 2015/0170020 | A1* | 6/2015 | Garimella | G06N 3/082 |
| | | | | 706/14 |
| 2015/0310858 | A1* | 10/2015 | Li | G10L 15/16 |
| | | | | 704/232 |
| 2015/0310862 | A1* | 10/2015 | Dauphin | G10L 15/1815 |
| | | | | 704/257 |
| 2015/0317990 | A1* | 11/2015 | Fousek | G10L 19/26 |
| | | | | 704/500 |

OTHER PUBLICATIONS

Song, Y. et al. "i-vector representation based on bottleneck features for language identification". Electronics Letters Nov. 21, 2013 vol. 49 No. 24 pp. 1569-1570.*

Abdel-Hamid, Ossama et al., "Applying Convolutional Neural Networks Concepts to Hybrid NN-HMM Model for Speech Recognition", 2012 IEEE Conference on Acoustic, Speech and Signal Processing (ICASSP), 4 pages.

Davis, Andrew S. et al., "Low-Rank Approximations for Conditional Feedforward Computation in Deep Neural Networks", Jan. 28, 2014, arXiv:1312.4661 [cs.LG], 10 pages.

Denil, Misha et al., "Predicting Parameters in Deep Learning", Advances in Neural Information Processing Systems 26 (NIPS 2013), 9 pages.

Grezl, Frantisek et al., Optimizing Bottle-Neck Features for LVCSR, in 2008 IEEE Conference on Acoustic, Speech and Signal Processing (ICASSP), 4 pages.

Hinton, Geoffrey et al., "Deep Neural Networks for Acoustic Modeling in Speech Recognition", IEEE Signal Processing Magazine, Nov. 2012, 16 pages.

Keshet, Joseph et al., "Discriminative Keyword Spotting", preprint submitted to Elsevier, Oct. 6, 2008, 27 pages.

Lamel, Lori F. et al., "Speech Database Development: Design and Analysis of the Acoustic-Phonetic Corpus", Speech Input/Output Assessment and Speech Databases, Noordwijkerhout, the Netherlands, Sep. 20-23, 1989, 10 pages.

Liao, Hank et al., "Large Scale Deep Neural Network Acoustic Modeling with Semi-Supervised Training Data for Youtube Video Transcription", 2013 IEEE Workshop on Automatic Speech Recognition and Understanding (ASRU), 6 pages.

Nguyen, Patrick an Phu et al., "Keyword Detection Based on Acoustic Alignment", U.S. Appl. No. 13/861,020, filed Apr. 11, 2013, 130 pages.

Peddinti, Vijayaditya et al., "Deep-Scattering Spectrum with Deep Neural Networks", 2014 IEEE Conference on Acoustic, Speech and Signal Processing (ICASSP), 5 pages.

Sainath, Tara N. et al., "Learning Filter Banks Within a Deep Neural Network Framework", 2013 IEEE Workshop on Automatic Speech Recognition and Understanding (ASRU), 6 pages.

Sainath, Tara N. et al., "Low-Rank Matrix Factorization for Deep Neural Network Training with High-Dimensional Output Targets", 2013 IEEE Conference on Acoustic, Speech and Signal Processing (ICASSP), 5 pages.

Sainath, Tara N., "Deep Convolutional Neural Networks for LVCSR", 2013 IEEE Conference on Acoustic, Speech and Signal Processing (ICASSP), 5 pages.

Senior, Andrew et al., "Fine Context, Low-Rank, Softplus Deep Neural Networks for Mobile Speech Recognition", 2014 IEEE Conference on Acoustic, Speech and Signal Processing (ICASSP), 5 pages.

Sensory Inc.—Embedded Speech Technologies for Consumer Electronics, Downloaded from the internet on Sep. 17, 2014 at http://www.sensoryinc.com/, 2 pages.

Soltau, Hagen et al., "Joint Training of Convolutional and Non-Convolutional Neural Networks", 2014 IEEE Conference on Acoustic, Speech and Signal Processing (ICASSP), 5 pages.

Vanhoucke, Vincent O., et al. "Keyword Detection Without Decoding", U.S. Appl. No. 13/860,982, filed Apr. 11, 2013, 144 pages.

Xue, Jian et al., "Singular Value Decomposition Based Low-Footprint Speaker Adaptation and Personalization for Deep Neural Network", 2014 IEEE Conference on Acoustic, Speech and Signal Processing (ICASSP), 5 pages.

Zhang, Yu et al., "Extracting Deep Neural Network Bottleneck Features Using Low-Rank Matrix Factorization", 2014 IEEE Conference on Acoustic, Speech and Signal Processing (ICASSP), 5 pages.

* cited by examiner

LOW-RANK HIDDEN INPUT LAYER FOR SPEECH RECOGNITION NEURAL NETWORK

CROSS-REFERENCE TO RELATED APPLICATION

This application claims the benefit of U.S. Provisional Application No. 62/057,599, filed Sep. 30, 2014, which is incorporated by reference.

BACKGROUND

Automatic speech recognition is one technology that is used in mobile devices. One task that is a common goal for this technology is to be able to use voice commands to wake up and have basic spoken interactions with the device. For example, it may be desirable to recognize a "hotword" that signals that the mobile device should activate when the mobile device is in a sleep state.

SUMMARY

In general, one innovative aspect of the subject matter described in this specification can be embodied in methods for training a deep neural network that includes a low rank hidden input layer and an adjoining hidden layer, the low rank hidden input layer including a first matrix A and a second matrix B with dimensions i×m and m×o, respectively, to identify a keyword that include the actions of receiving a feature vector including i values that represent features of an audio signal encoding an utterance, determining, using the low rank hidden input layer, an output vector including o values using the feature vector, determining, using the adjoining hidden layer, another vector using the output vector, determining a confidence score that indicates whether the utterance includes the keyword using the other vector, and adjusting one or more weights for the low rank hidden input layer based on an accuracy of the confidence score. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Adjusting the one or more weights for the low rank hidden input layer based on the accuracy of the confidence score may include adjusting a greater quantity of the weights in the low rank hidden input layer when the accuracy does not satisfy a threshold accuracy than a smaller quantity of the weights that would be adjusted when the accuracy satisfies the threshold accuracy.

In some implementations, the method may include determining a posterior probability score using the other vector, wherein determining the confidence score using the other vector comprises determining the confidence score using the posterior probability score. The method may include providing the deep neural network to a digital signal processor for processing audio signals. The method may include combining, by the low rank hidden input layer, the values of the first matrix A with the second matrix B using a linear function. The linear function may include a weighted sum. Determining, using the adjoining hidden layer, the other vector using the output vector may include determining the other vector using a non-linear function. The non-linear function may include a rectified linear unit (ReLU) function.

The subject matter described in this specification can be implemented in particular embodiments so as to realize one or more of the following advantages. In some implementations, a system trained with a low rank hidden input layer may have a small memory footprint, e.g., to fit in a memory of a digital signal processor (DSP), low latency, and/or low computational cost. In some implementations, a system trained with a low rank hidden input layer may have high accuracy. In some implementations, a deep neural network is trained to directly predict key phrases, keywords and/or sub-word units of the keywords. In some implementations, a system may make a determination about every ten milliseconds regarding whether or not a keyword or key phrase has been identified. In some implementations, determining a posterior probability for an entire word as output for a deep neural network reduces the number of neural network parameters in an output layer of the neural network, allows a simple posterior handling method to make a determination regarding whether or not a window includes a keyword or a key phrase, and/or achieves better performance than determining a posterior probability for a sub-word unit.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A deep neural network with a low rank hidden input layer is trained to allow a speech recognition system on a user device, e.g., a mobile phone, to wake up and have basic spoken interactions with a user in response to receipt of voice commands. The deep neural network with a low rank hidden input layer allows the speech recognition to perform fast and low latency, power efficient, flexible, and speaker adaptive, e.g., specific to a particular user or speaker, speech recognition. The speech recognition system can allow a user experience designer, an administrator, or a user to determine the keywords the deep neural network is trained to identify.

In some examples, the use of a low rank hidden input layer in a deep neural network may reduce parameters of a deep neural network acoustic model. This model may have a small footprint, e.g., less than ~50 kb, which may be necessary to allow a digital signal processor (DSP) to store the model in memory.

A user device may use the deep neural network to analyze received audio waveforms and determine if a sequence of frames from an audio waveform include a digital representation of one of the specific keywords or key phrases that correspond with the second training set. Upon determination that a sequence of frames contains a digital representation of one of the specific keywords, or has probability above a threshold probability that the sequence of frames contains a digital representation of one of the specific keywords, the user device may perform an action that corresponds with the one of the specific keywords. For instance, the user device may exit a standby state, launch an application, or perform another action.

Figure 1:
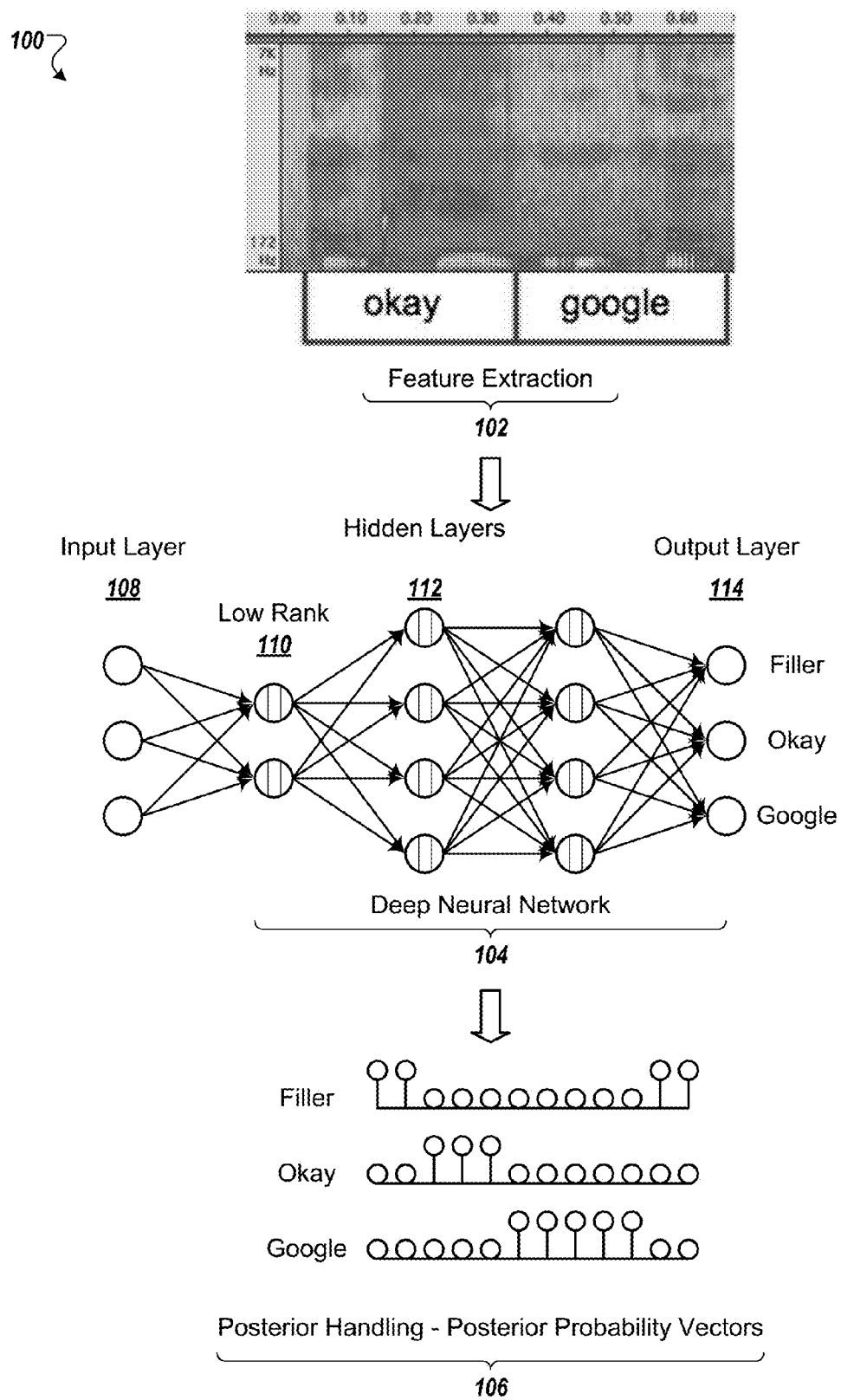
FIG. 1 is an example of a speech recognition system with a deep neural network.

FIG. 1 is an example of a speech recognition system 100 with a deep neural network. The speech recognition system 100 includes a feature extraction module 102, a deep neural network 104, and a posterior handling module 106. The feature extraction module 102 performs voice-activity detection and generates a feature vector for every frame of audio data, e.g., from an audio waveform. For example, the speech recognition system 100 may receive an audio signal, e.g., as a continuous stream of data, that encodes an utterance and split the stream into multiple frames of data, e.g., when each frame is associated with 10 milliseconds of audio stream data.

The feature extraction module 102 may analyze each of the frames to determine feature values for the frames and places the features values in feature vectors which can be stacked, e.g., using left and right context of adjacent feature vectors, to create a larger feature vector. Each feature vector may include multiple numeric values that represent features of the corresponding frame.

The quantity of numeric values corresponds with the quantity of nodes in an input layer 108 of the deep neural network. For instance, when the feature vectors have twenty-five values, the input layer 108 has twenty-five nodes. In some examples, when the feature vectors have forty values, the input layer 108 has forty nodes.

A feature vector, for a single frame or a stacked vector for multiple frames, is provided to the deep neural network 104 that is trained to predict posterior probabilities from the features values included in a feature vector. The posterior probabilities correspond with entire words or sub-word units for the keywords or key phrases and represent the probability that a keyword or key phrase is included in a frame or multiple consecutive frames, e.g., that correspond to the stacked vector.

The posterior handling module 106 combines the posterior probabilities from multiple feature vectors into a confidence score used to determine whether or not an utterance encoded in an audio signal, e.g., included in the frames that correspond with the feature vectors, is a keyword or a key phrase.

For example, as shown in FIG. 1, the speech recognition system 100 may receive an audio signal encoding for a window of time when the audio signal includes data representing an utterance of the key-phrase "Okay Google". The speech recognition system 100 divides the window into twelve or on the order of one-hundred frames. The feature extraction module 102 determines features values for each of the twelve frames, creates feature vectors with the corresponding feature values for the twelve frames, and provides the twelve feature vectors to the deep neural network 104, e.g., to the input layer 108.

In the example shown in FIG. 1, the deep neural network 104 was trained to identify probabilities for three categories of content including the probability that a feature vector corresponds with the keywords "Okay", and "Google", and the probability that the feature vector does not correspond with either of the keywords, e.g., and is "filler". Each node in a low rank hidden input layer 110 of the deep neural network 104 receives numerical values from nodes in the input layer 108, combines the numerical values and optionally weights the numerical values, and provides output to nodes in a subsequent hidden layer 112. The remaining layers of the deep neural network 104 analyze the values generated from the low rank hidden input layer 110, generate frame-level posterior probabilities for each of the three categories and provide the frame-level posterior probabilities to the posterior handling module 106.

The posterior handling module 106 combines the probabilities for the frames, e.g., received from an output layer 114, to determine a final confidence score for the received window. For example, the posterior handling module 106 combines the probabilities and determines that the window included "filler" in the first two frames, the keyword "okay" in the next three frames, e.g., when each of the frames is associated with a different portion of the keyword, the keyword "Google" in frames six through ten, and "filler" in the remaining two frames. The determination may be specific to a particular frame or for the entire window.

In some implementations, the feature extraction module 102 analyzes only the portions of an audio signal that are determined to include speech to reduce computation. For example, the feature extraction module 102 may include a voice-activity detector that may use thirteen-dimensional perceptual linear prediction (PLP) features and their deltas and double-deltas as input to a thirty-component diagonal covariance Gaussian Markov Model, to generate speech and non-speech posteriors for each frame. The feature extraction module 102 may perform temporal smoothing on the speech and non-speech posteriors to identify regions where the speech posteriors exceed a threshold and the corresponding frame is likely to include speech.

For frames that include speech regions, the feature extraction module 102 may generate acoustic features based on forty-dimensional log-filterbank energies computed every ten milliseconds over a window of twenty-five milliseconds. The feature extraction module 102 may stack contiguous frames to add sufficient left and right context, e.g., as the speech recognition system 100 receives additional data and the analysis of the frames progresses, and provide feature vectors for the stack of frames to the deep neural network 104. For example, the input window may be asymmetric since each recently received frame may add about ten milliseconds of latency to the speech recognition system 100. In some implementations, the speech recognition system 100 stacks ten recently received frames and thirty previously received frames.

For instance, for a current frame, the speech recognition system 100 may analyzed fifteen, twenty, or thirty previously received frames, e.g., represented to the left of the current frame in a graph, and five or ten recently received frames, e.g., represented to the right of the current frame in the graph.

The deep neural network 104 may be a feed-forward fully connected neural network with k hidden layers, m hidden nodes in the low rank hidden input layer 110, and n hidden nodes in each of the other hidden layers 112. Each node in the low rank hidden input layer 110 computes a linear function, e.g., a weighted sum, of the output from the input layer 108 and each node in the other hidden layers 112 computes a non-linear function of the weighted sum of the output of the previous layer, e.g., a rectified linear unit (ReLU) function.

In some examples, the low rank hidden input layer 110 may have thirty-two or forty-eight nodes. In some implementations, each of the other hidden layers 112 may have one-hundred twenty-eight nodes. For example, each of the other hidden layers 112 has more nodes than the low rank hidden input layer 110. In some implementations, some of the other hidden layers 112 may have a different number of nodes.

The nodes in the output layer 114 may use softmax activation functions to determine an estimate of the posterior probability of each output category. The output layer 114 may have one node per category of the deep neural network 104, e.g., one for each keyword and, optionally, one for filler. In some implementations, the size of the deep neural network 104 is determined based on the number of output categories, e.g., keywords and/or key phrases and filler.

The output categories of the deep neural network 104 can represent entire words or sub-word units in a keyword or a key-phrase. For instance, during keyword or key-phrase detection, the output categories of the deep neural network 104 can represent entire words. The deep neural network 104 may receive the output categories during training and the output categories may be context dependent, e.g., specific to a particular device, software application, or user. For example, the output categories may be generated at training time via forced alignment using a standard Gaussian mixture model or deep neural network based large vocabulary continuous speech recognition system, e.g., a dictation system.

The deep neural network 104 is trained to determine a posterior probability $p_{i_j}$ for the $i^{th}$ output category and the $j^{th}$ frame $x_j$, where the values of i are between 0 and n−1, with n the number of total categories. In some implementations, 0 corresponds with the category for non-keyword content, e.g., content that corresponds with the "filler" category. The parameters, e.g., the weights and biases, of the deep neural network 104, θ, may be estimated by maximizing the cross-entropy training criterion over the labeled training data $\{x_j, i_j\}_j$ using Equation (1) below.

$$F(\theta) = \Sigma_j \log(p_{i_j j}) \quad (1)$$

In some implementations, the deep neural network 104 may be trained with a software framework that supports distributed computation on multiple CPUs in deep neural networks. In some implementations, the deep neural network 104 is trained using asynchronous stochastic gradient descent with an exponential decay for the learning rate.

In some implementations, some of the deep neural network 104 parameters are initialized with the corresponding parameters of an existing deep neural network of the same size and similar type of training dataset, and are not trained from scratch. For example, the deep neural network 104 may be previously trained for speech recognition with a suitable initial training set to initialize the hidden layers of the deep neural network 104 where the parameters for all layers of the deep neural network 104 are updated during training. The deep neural network 104 may then be trained using a second training set, potentially smaller than the initial training set, that includes data for the output categories, e.g., the specific keywords and key phrases which the deep neural network 104 will identify.

In some implementations, a first training set includes features values for uttered speech with output values relevant to large vocabulary dictation. A neural network for large vocabulary continuous speech recognition (LVCSR) may produce these output values e.g., as sub-word units. For instance, sub-word units may be n-grams, triphones, or variable length phoneme sequences. In one example, a LVCSR system, e.g., executing on a server, may have 14K states, e.g., compared to a smaller embedded system which may have 2K states. The number of states may be selected by considering all triphones possible and pruning them to the most frequent triphones found in a respective language, e.g., English, using a Decision Tree. The deep neural network 104 may then be trained with the second training set that includes feature values for speech uttered in the same language as the speech represented by the first training set.

Some of the parameters of the deep neural network 104 may remain constant when the deep neural network 104 is trained with the second training set. For instance all of the parameters for a particular layer, other than the output layer, may be held constant while training the deep neural network 104 with the second training set. In some examples, the parameters for two or more nodes in different layers may be held constant while training the deep neural network 104 with the second training set. This form of training may allow the hidden layers to learn a better and more robust feature representation by exploiting larger amounts of data and avoiding bad local optima.

For example, the deep neural network 104 may be trained initially using three-thousand hours of speech, where all of the parameters of the deep neural network 104 are adjusted during training. The deep neural network 104 may then be trained using examples for each keyword, e.g., "Okay" and "Google," and using negative examples, e.g., for the "filler" category, where some of the parameters of the deep neural network 104 are adjusted while others remain constant.

The negative examples may include anonymized voice search queries, e.g., when the deep neural network 104 is specific to a particular user, or other short phrases. In some examples, the deep neural network 104 is trained using about one thousand to about two thousand, e.g., 2.2-2.3 k, keyword or key phrase training examples in the second training set. In some examples, the deep neural network 104 is trained using between about 1 k to about 40 k keyword or key phrase training examples in the second training set. In some examples, the deep neural network 104 is trained using about 70 k to about 133 k negative examples in the second training set.

When the deep neural network 104 is trained with the second training set, for the specific keywords and/or key phrases, the deep neural network 104 may discard the output layer generated with the first training set and create a new output layer, e.g., with one output node for each keyword and key phrase, and optionally one output node for "filler".

The deep neural network 104 may be trained to determine posterior probabilities for specific keywords, key phrases, key sub-word units, or a combination of the three. In some implementations, the deep neural network 104 may trained to determine a posterior probability for a keyword that is also included in a key phrase. For example, the posterior handling module 106 may combine the posterior probabilities for two key words to determine a probability for a key phrase.

The deep neural network 104 provides the posterior probabilities to the posterior handling module 106. The posterior handling module 106 may smooth the posterior probabilities over a fixed time window of size $w_{smooth}$ to remove noise from the posterior probabilities, e.g., where posterior probabilities corresponding with multiple frames are used to determine whether a keyword was included in a window. For example, to generate a smoothed posterior probability $p_{i_j}'$ from the posterior probability $p_{i_j}$, for the $i^{th}$ output category and the $j^{th}$ frame $x_j$, where the values of i are between 0 and n−1, with n the number of total categories, the posterior handling module 106 may use Equation (2) below.

$$p'_{i_j} = \frac{1}{j - h_{smooth} + 1} \sum_{k=h_{smooth}}^{j} p_{ik} \qquad (2)$$

In Equation (2), $h_{smooth}=\max\{1, j-w_{smooth}+1\}$ is the index of the first frame within the smoothing window. In some implementations, $w_{smooth}=30$ frames.

The posterior handling module 106 may determine a confidence score for the $j^{th}$ frame $x_j$ within a sliding window of size $w_{max}$ using Equation (3) below.

$$\text{confidence} = \sqrt[n-1]{\prod_{i=1}^{n-1} \max_{h_{max} \leq k \leq j} p'_{ik}} \qquad (3)$$

In Equation (3), $p_{i_j}'$ is the smoothed state posterior, and $h_{max}=\max\{1, j-w_{max}+1\}$ is the index of the first frame within the sliding window. In some implementations, $w_{max}=100$. In some implementations, when Equation (3) does not enforce the order of the sub-word unit sequence, stacked feature vectors are fed as input to the deep neural network 104 to help encode contextual information.

In some implementations, the speech recognition system 100 is a large vocabulary conversational speech recognition system.

Figure 2:
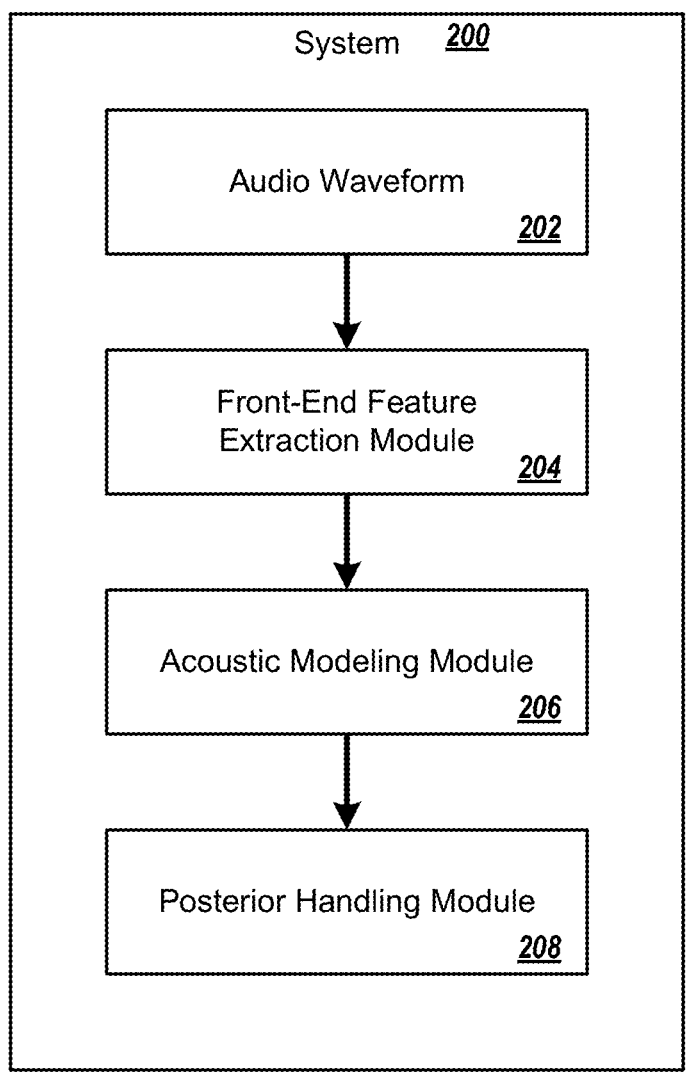
FIG. 2 is an example system for determining whether an audio waveform contains a digital representation of a specific keyword or key phrase.

FIG. 2 is an example system 200 for determining whether an audio waveform contains a digital representation of a specific keyword or key phrase. The system 200, e.g., the speech recognition system 100, receives an audio waveform 202 and provides the audio waveform 202 to a front-end feature extraction module 204. For example, a microphone may capture an analog or digital representation of sound as the audio waveform 202 from a physical environment, e.g., that contains the microphone. The system 200 may include the microphone or another system may include the microphone and send the audio waveform 202 to the system 200.

The front-end feature extraction module 204 analyzes the audio waveform 202 to generate a series of feature vectors, described with reference to FIG. 3. Once the front-end feature extraction module 204 has finished the processing of the audio waveform 202, the front-end feature extraction module 204 sends the features vectors to an acoustic modeling module 206.

The acoustic modeling module 206 may use a variety of techniques, described with reference to FIG. 4, to analyze the feature vectors and produce posterior probability vectors that are representative of whether or not portions of the audio waveform 202 contain specific words or phrases for which the acoustic modeling module is programmed.

Figure 5:
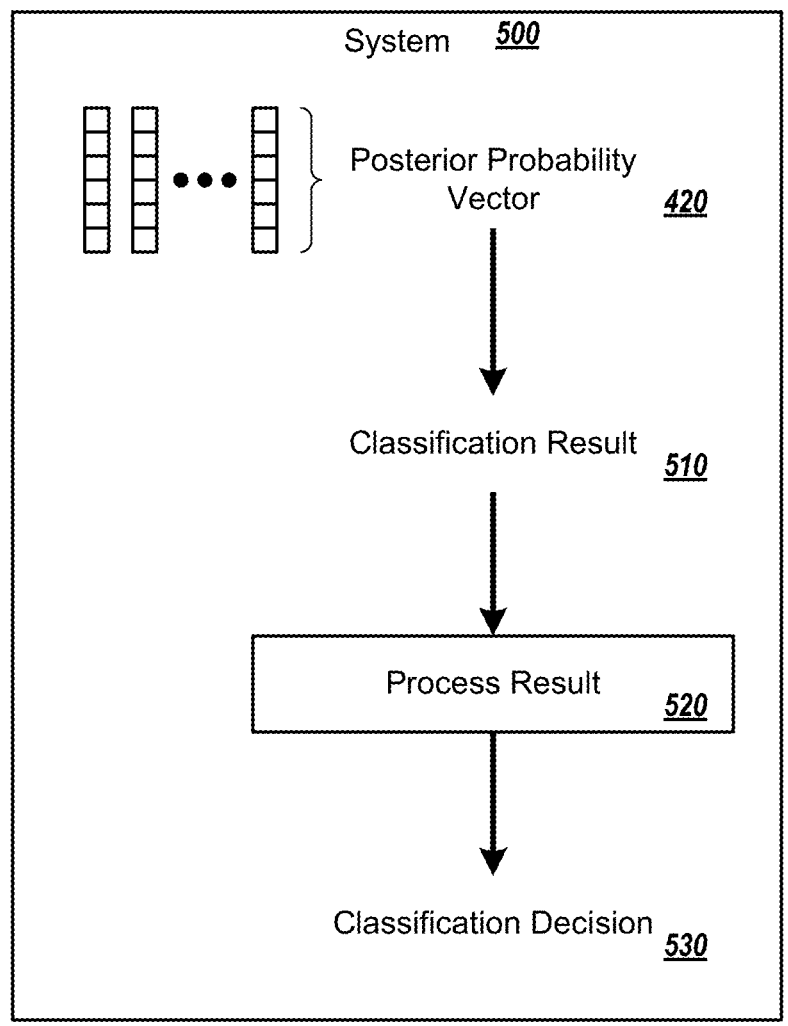
FIG. 5 is a block diagram of an example system for determining when an audio waveform contains a digital representation of a keyword or key phrase.

The acoustic modeling module 206 provides the posterior probability vectors to a posterior handling module 208 that uses the posterior probability vectors to determine a posterior probability, and potentially a confidence score, that indicates whether a keyword or a key phrase is present in the corresponding audio waveform, as describe with reference to FIG. 5.

Various system embodiments are similar in their overall structure. They include modules that use similar architectures to accomplish similar goals: 1) front-end feature extraction, 2) acoustic modeling, and 3) posterior handling.

Figure 3:
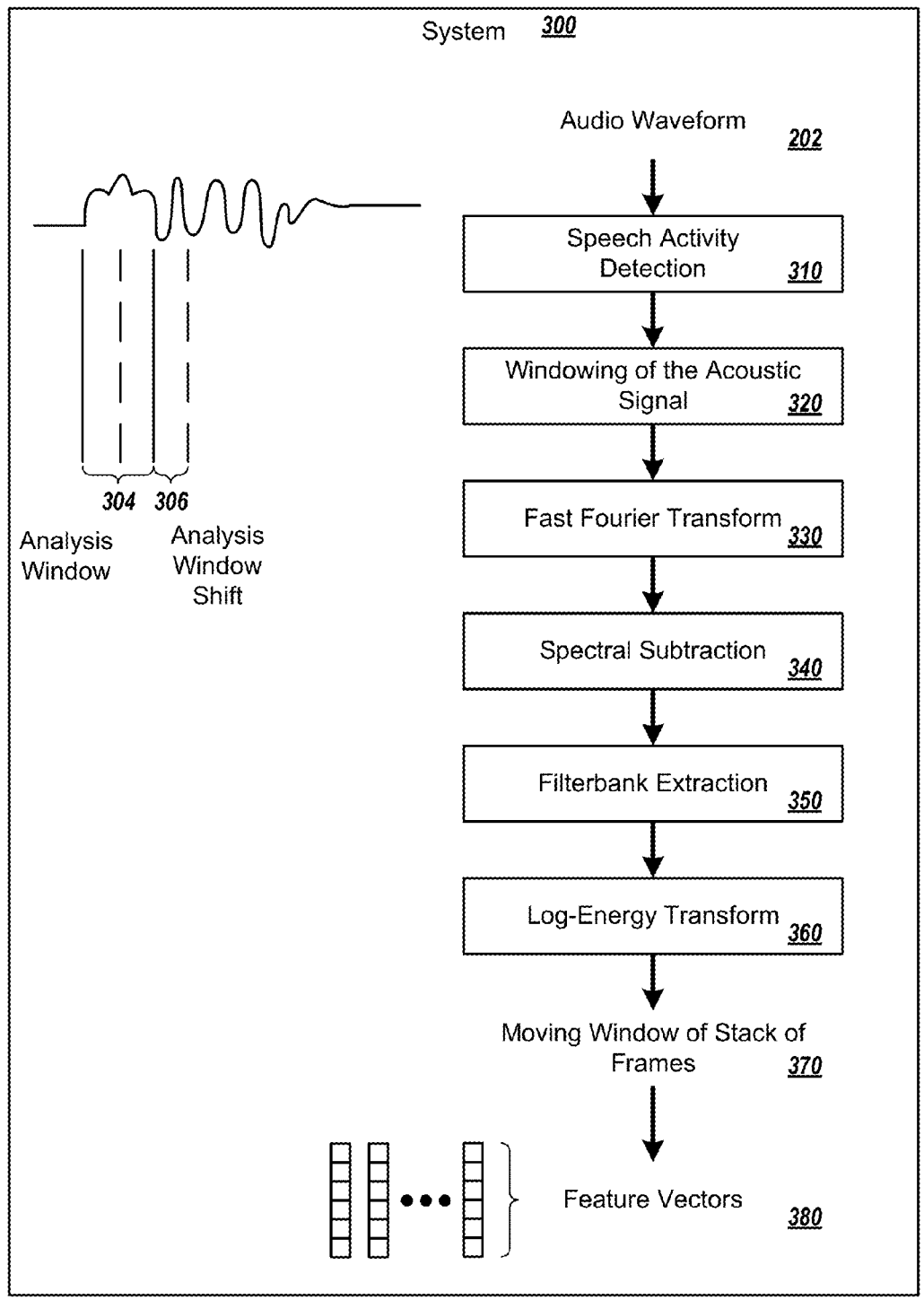
FIG. 3 is a block diagram of an example system for a feature extraction process.

FIG. 3 is a block diagram of an example system 300 for a feature extraction process. For example, the front-end feature extraction module 204 may receive the audio waveform 202. The front-end feature extraction module 204 may analyze the audio waveform 202 by dividing the audio waveform 202 into a plurality of windows and analyzing each of the windows, e.g., separately. For example, the front-end feature extraction module 204 may identify an analysis window 304 with a specific size, e.g., a 25 ms time period, for the audio waveform 202. The front-end feature extraction module 204 may obtain multiple analysis windows in succession by performing an analysis window shift 306, for example a 10 ms time period shift.

One or more analysis windows may overlap. For example, one analysis window may represent audio waveform 202 from a start time of 0 ms to an end time of 25 ms and a subsequent analysis window may represent audio waveform 202 from a start time of 10 ms to an end time of 35 ms.

The analysis windows 304 are obtained as part of speech activity detection 310, in which the system 300 obtains information about available sound in its environment, e.g., the physical environment surrounding a microphone that captured the audio waveform 202. Speech activity detection 310 may occur regardless of whether there is sound in the surrounding environment, or speech activity detection 310 may occur only when the system 300 detects a volume of sound greater than a threshold volume, e.g., in the audio waveform 202.

Once speech activity detection 310 occurs, the front-end feature extraction module 204 creates a plurality of acoustic windows from the acoustic signal 320. In some implementations, each window may have a short time interval, such as 25 ms, that represents characteristics of audio waveform 202 over that time interval.

After windowing, the front-end feature extraction module 204 may perform a Fast Fourier transform 330 on the windowed data to analyze the constituent frequencies present in the audio waveform.

In some implementations, the front-end feature extraction module 204 may perform spectral substitution 340 to minimize the noise in the windowed data, e.g., the transformed windowed data. The spectral substitution may minimize any potential negative effects of noise in the audio waveform 202 during later processing.

The front-end feature extraction module 204 may perform filter bank extraction 350 to separate individual components of the audio data from one another. Each of the individual components generated during filter bank extraction 350 may carry a single frequency sub-band of the audio waveform 202 or the windowed data.

In some implementations, the front-end feature extraction module 204 performs a log-energy transform 360 on the received data to normalize the data, e.g., the windowed data.

The normalization of the data may enhance relevant features in the data that are used in subsequent processing.

The front-end feature extraction module 204 generates a moving window of a stack of frames 370. The stack of frames 370 may include eleven or twenty-six frames, each including data represent 25 ms of the audio waveform 202, with a shift of 10 ms between consecutive frames. The stack of frames 370 may include as few as two frames or any larger number of frames, such as forty or fifty frames. The size of the stack of frames 370 may depend on the length of the keyword, key phrase, or acoustic unit predicted by the system 200.

The front-end feature extraction module 204 generates a plurality of feature vectors 380 that represent acoustic features of frames from the audio waveform 202 by performing the aforementioned analytical techniques to obtain information about characteristics of the audio waveform 202 for successive time intervals. In some examples, the numerical values in each of the feature vectors 380 represent properties of the corresponding frames. For instance, each of the feature vectors 380 may have forty values. Each of the values may be generated using a filter bank included in the front-end feature extraction module 204 and the system 300.

Figure 4:
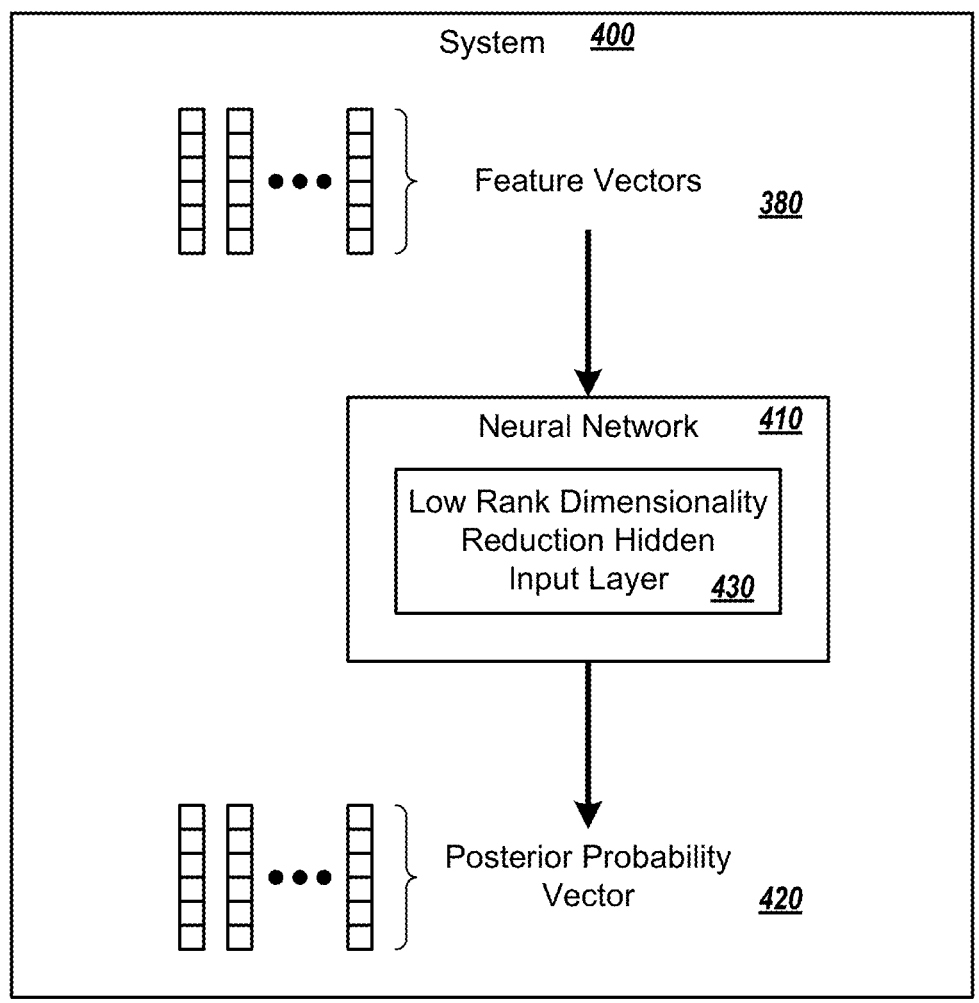
FIG. 4 is a block diagram of an example system for determining a posterior probability vector.

FIG. 4 is a block diagram of an example system 400, e.g., a neural network system, for determining a posterior probability vector. For instance, the acoustic modeling module 206, shown in FIG. 1, receives the plurality of feature vectors 380 from the front-end feature extraction module 204, one for each of the frames 370, and generates a corresponding posterior probability vector 420 for each of the feature vectors 380. For a particular feature vector, the corresponding posterior probability vector 420 includes a value for each of the keywords or key phrases for which the speech recognition system is trained. The value indicates the probability that the frame represented by the feature vector includes at least a portion of an audio signal of the corresponding keyword or key phrase.

The acoustic modeling module 206 includes a neural network 410, such as the deep neural network 104 described with reference to FIG. 1, that generates the corresponding set of posterior probability vectors 420, where each of the posterior probability vectors 420 corresponds with one of the feature vectors 380.

The acoustic modeling module 206 is trained to determine whether a stack of feature vectors matches a keyword or key phrase. For example, the neural network 410 may receive a training set of two expected event vectors for the keywords "Okay" and "Google" or one expected event vectors for the key phrase "Okay Google".

The system 400 trains a low rank dimensionality reduction hidden input layer 430, included in the neural network 410, concurrently with the other layers in the neural network 410. For instance, the system 400 provides feature vectors 380 for the keywords "Okay" and "Google" to the low rank dimensionality reduction hidden input layer 430 during the training process. The low rank dimensionality reduction hidden input layer 430 then uses weights to determine output values and provides the output values to the next hidden layer in the neural network 410.

In some examples, the low rank dimensionality reduction hidden input layer 430 may be represented by two matrices. For instance, when the low rank dimensionality reduction hidden input layer 430 has i input values and o output values, the system 400 may determine a matrix A with dimensions i×o, a rank r of the matrix A, and new matrices B and C with dimensions i×r and r×o, respectively, where A=B×C. The system 400 then uses matrices B×C for the low rank dimensionality reduction hidden input layer 430. In some examples, the system 400 determines the matrices B and C without determining the matrix A.

The neural network 410 may be trained with a first, general training set and a second, specific training set, e.g., where the second training set includes the expected event vectors for the keywords "Okay" and "Google" or the one expected event vector for the key phrase "Okay Google".

The acoustic modeling module 206 processes each of the feature vectors 380 using the neural network 410 to determine if properties of the feature vector match the properties of the expected event vectors for the keywords "Okay" and "Google" and generates a posterior probability for each of the expected event vectors where the posterior probability is representative of the similarity of the properties. For instance, a higher score may represent a greater similarity between a feature vector and an expected event vector compared to a lower score. In some examples, a lower score may represent a greater similarity between a feature vector and an expected event vector compared to a higher score.

When the acoustic modeling module 206 processes a first feature vector and the acoustic modeling module 206 is programmed to identify two keywords, "Okay" and "Google," a first posterior probability vector corresponding to the first feature vector includes at least two posterior probability scores, one for each of the keywords. Each of the posterior probability scores represents the degree of acoustic match between the first feature vector and the expected event vectors. The acoustic modeling module may use Equation (2) above to determine a posterior probability.

For example, when the first feature vector is associated with the spoken word "Okay," the scores for "Okay" and "Google" may be 1.0 and 0.0 respectively. In some examples, when the first feature vector is associated with the spoken word "Search," the scores for "Okay" and "Google" are both 0.0. In some examples, when the first feature vector is associated with the spoken word "Google," the scores for "Okay" and "Google" are 0.0 and 0.95 respectively, e.g., when there may be a potentially small difference between the first feature vector and the expected event vector for "Google".

In some implementations, the posterior probability vector 420 may include a "non-keyword" or "filler" posterior probability score, e.g., three posterior probability scores. For example, the filler score for a feature vector associated with the spoken word "Okay" would be 0.0 and the filler score for the spoken word "Search" may be 1.0 when the acoustic modeling module 206 includes only two keywords, "Okay" and "Google." In these implementations, when the acoustic modeling module 206 is programmed to identify two keywords, the first posterior probability vector 420 includes at least three scores.

In some implementations, a sum of the posterior probability scores in a posterior probability vector 420 is 1.0. For example, the sum of the posterior probability scores for the spoken word "Okay" would be 1.0 (the "Okay" keyword score)+0.0 (the "Google" keyword score)+0.0 (the filler score)=1.0 and the sum of the scores for the spoken word "Google" may be 0.0 (the "Okay" keyword score)+0.95 (the "Google" keyword score)+0.05 (the filler score)=1.0.

The posterior probability scores may represent the confidence of the acoustic modeling module 206 that the acoustic properties of a feature vector match an expected event vector. In some examples, when the acoustic modeling module 206 identifies a match between a feature vector and an expected event vector, the corresponding posterior probability score might not be 1.0 based on a variance between the feature vector and the expected event vector, such as with the example for the spoken word "Google" above.

In some implementations, the acoustic modeling module 206 may determine a confidence score from a posterior probability score or multiple posterior probability scores. For example, the acoustic modeling module 206 may determine a confidence score using Equation (3) above.

In some implementations, an expected event vector may represent a key phrase. For example, a first expected event vector may correspond with the key phrase "Okay Google" and a second expected event vector may correspond with the keyword "Google." In this example, when the acoustic modeling module 206 receives a feature vector for the spoken phrase "Okay Google," the posterior probability score for the key phrase "Okay Google" may be 0.7 and the posterior probability score for the key phrase "Google" may be 0.3.

In some implementations, the acoustic modeling module scores a key phrase based on the order of the words or sub-word units in the key phrase. For example, when a key phrase includes the sub-word units "oh," "kay," "g$\overline{oo}$," and "gɔl," the acoustic modeling module 206 determines whether a continuous sequence of four feature vectors acoustically match the expected event vectors for the sub-word units "oh," "kay," "goo," and "gal," and assigns a posterior probability score to the sequence of feature vectors accordingly. The acoustic modeling module 206 may generate a posterior probability vector for each set of four continuous feature vectors where the posterior probability vector includes scores that represent the similarity of the feature vectors to the key phrase and any other keywords or key phrases for which the acoustic modeling module 206 is trained. If the acoustic modeling module 206 identifies four feature vectors that are similar to the sub-word units "oh," "kay," "g$\overline{oo}$," and "g/əl" but in a different order, the corresponding score in a posterior probability vector is low, e.g., 0.0.

In some implementations, the acoustic modeling module 206 may be trained to identify words or phrases spoken by a particular user. For example, the acoustic modeling module 206 may be trained to identify a pronunciation of the particular user speaking keywords or key phrases such that when a different user speaks the specific keywords or key phrases, the acoustic modeling module 206 generates low keyword posterior probability scores for the keywords or key phrases spoken by the different user, e.g., 0.0. In these implementations, the training data for the acoustic modeling module 206 may include data representing the specific keywords spoken by the particular user and data representing the specific keywords spoken by different users. For instance, the second training set may include examples of the keywords and key phrases spoken by the particular user, e.g., as positive examples, and keywords and key phrases spoken by other users, e.g., as negative examples.

FIG. 5 is a block diagram of an example system 500 for determining when an audio waveform contains a digital representation of a keyword or key phrase. For example, the posterior handling module 208 receives the posterior probability vector 420 from the acoustic modeling module 206. In some examples, the posterior handling module 208 may use support vector machine or logistic regression to make a binary decision about whether a keyword or a key phrase was uttered during a time window of the audio waveform 202 that is associated with the posterior probability vector 420.

The posterior handling module 208 produces classification result 510. This may be an actual classification decision 530, in terms of a Boolean decision confirming that a keyword or a key phrase was present in the audio waveform 202 or not.

In some implementations, the classification result 510 may be a posterior probability score and/or a confidence score, e.g., for a particular one of the keywords or key phrases. For example the posterior probability score may represent the likelihood that a keyword or a key phrase is present in the audio waveform 202 or a frame from the audio waveform 202. If classification result 510 is a posterior probability score, e.g., and not a binary value, the posterior handling module 208 may process the result 520 to generate the classification decision 530, for example, by comparing the classification result 510 with a threshold value.

In some implementations, the posterior handling module 208 combines corresponding posterior probability scores from multiple posterior probability vectors 420 to determine whether a keyword or key phrase was uttered during a time window of the audio waveform 202. For example, the posterior handling module 208 may average twenty or twenty-six posterior probability scores associated with the keyword "Google" from twenty or twenty-six consecutive posterior probability vectors and use the average, e.g., as a single posterior probability for a time period, to determine whether "Google" was spoken during the time period that corresponds with the twenty or twenty-six consecutive posterior probability vectors. In this example, the posterior handling module 208 would also average the posterior probability scores for the other keywords or key phrases represented in the posterior probability vectors, such as the "Okay" keyword posterior probability scores and the filler posterior probability scores.

The posterior handling module 208 may use any appropriate window for the consecutive posterior probability scores. For example, the posterior handling module 208 may average the corresponding scores from thirty consecutive posterior probability vectors.

The posterior handling module 208 uses the combination of the posterior probability scores to determine whether the keyword or key phrase was spoken during the time window of the audio waveform 202. For example, the posterior handling module 208 determines whether the combination is greater than a predetermined threshold value and, if so, determines that the keyword or key phrase associated with the combined posterior probability scores was likely spoken during the time window of the audio waveform 202.

In some implementations, the posterior handling module 208 combines corresponding posterior probability scores from multiple posterior probability vectors 420 by determining a geometric mean, a sum, or a product of the scores.

In some implementations, the posterior handling module 208 determines a maximum value of the posterior probability scores corresponding to a particular keyword or key phrase as the combination of the posterior probability scores. For example, the posterior handling module 208 may determine a maximum posterior probability score value from one-hundred consecutive posterior probability vectors 420 and use the maximum value when determining whether the audio waveform 202 includes the keyword or key phrase. In some examples, when the maximum value is greater than a predetermined threshold, the posterior handling module 208 determines that the keyword or key phrase was included in the audio waveform 202.

The posterior handling module 208 may move a window and/or may use windows of different sizes when determining whether a keyword or key phrase was spoken during a different portion of the audio waveform 202. For example, the posterior handling module 208 may look at different overlapping or non-overlapping windows and determine a combination of the posterior probability scores for the different window.

In some implementations, the posterior handling module 208 enforces the order of words or sub-word units associated with keywords or key phrases. For example, when the acoustic modeling module generates posterior probability scores for words that are portions of a key phrase, the posterior handling module 208 determines whether the portions of the key phrase occurred in the correct order when determining whether the key phrase was recorded in the audio waveform 202.

For example, when the key phrase is "Okay Google" and the posterior handling module 208 receives a first posterior probability vector with a score of 1.0 for "Okay" and a second posterior probability vector with a score of 1.0 for "Google," when the first posterior probability vector corresponds with a portion of the audio waveform immediately prior to the portion of the audio waveform that corresponds with the second posterior probability vector without any intermediate portions, the posterior handling module 208 determines that the key phrase "Okay Google" was recorded in the audio waveform 202. The posterior handling module 208 may perform a similar process for portions of keywords, such as "goo" and "gle" or "goo" and "gɔl".

In some examples, when the posterior handling module 208 determines that a first posterior probability vector has a score of 1.0 for "Google" and a second posterior probability vector has a score of 1.0 for "Okay," when the second posterior probability vector corresponds with a later portion of the audio waveform 202 than the first posterior probability vector and/or at least one feature vector corresponds with a portion of the audio waveform 202 between the portions of the audio waveform that correspond with the first and second posterior probability vectors. In these examples, the posterior handling module 208 determines that the key phrase "Okay Google" was not recorded in those portions of the audio waveform 202.

Figure 6:
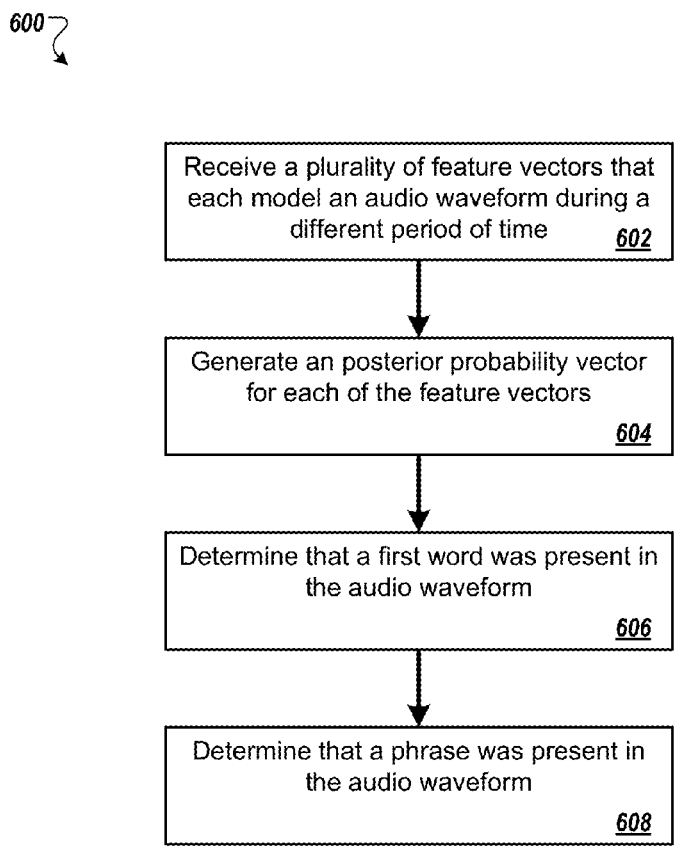
FIG. 6 is a flowchart of an example process for detecting keyword utterances in an audio waveform.

FIG. 6 is a flowchart of an example process 600 for detecting keyword utterances in an audio waveform.

The process receives feature vectors (602). For example, step 602 may be performed as described with reference to FIG. 3, such that the front-end feature extraction module 204 processes the audio waveform 202 to yield the feature vectors 380.

The process generates a posterior probability vector for each of the feature vectors (604). Each posterior probability vector includes a set of posterior probability scores that characterize an acoustic match between the corresponding feature vector and a set of expected event vectors. Each of the expected event vectors corresponds with one of the posterior probability scores and defines acoustic properties of at least a portion of a keyword. In some implementations, a sum of the set of posterior probability scores for each posterior probability vector is one.

The process determines that a first word was present in the audio waveform (606). For example, the posterior handling module determines that the first word was present in the audio waveform during an overall period of time modeled by the feature vectors by combining corresponding posterior probability scores from the posterior probability vectors. The first word corresponds with at least one keyword or with at least a portion of one of the key phrases, a corresponding one of the expected event vectors, and a corresponding one of the scores in the posterior probability vector.

In some implementations, the posterior handling module combines the posterior probability scores by averaging, by determining a geometric mean, by determining a sum, a product, or a maximum score for each of the corresponding posterior probability scores from the posterior probability vectors.

The process determines that a phrase was present in the audio waveform (608). For example, the posterior handling module determines that a predetermined key phrase was present in the audio waveform during the overall period of time modeled by the feature vectors. The predetermined phrase includes the first word and potentially a second word that corresponds to at least another portion of the key phrase and a corresponding one of the expected event vectors.

The predetermined key phrase represents a key phrase for which the acoustic modeling module is programmed to identify. For example, the first and the second words might not be keywords alone but combine to form a key phrase that is of importance for the posterior handling module when the first and second words are identified in sequence.

For example, when the posterior handling module determines that the second word occurred in the audio waveform immediately prior to the first word, the posterior handling module determines that the audio waveform does not include the predetermined key phrase, assuming no other specific words were identified for which the acoustic modeling module was programmed.

When the posterior handling module identifies the first word immediately prior to the second word, without any intervening words and based on the posterior probability vectors, the posterior handling module determines that the audio waveform includes a key phrase and provides data associated with the key phrase to another module in a system, e.g., that performs an action based on the keyword or the key phrase.

In some implementations, the process 600 can include additional steps, fewer steps, or some of the steps can be divided into multiple steps. For example, the acoustic modeling module may perform steps 602 through 606 without performing step 608, e.g., when identifying a keyword and not a key phrase.

In some implementations, the acoustic modeling module uses a neural network, e.g., a deep neural network, to generate the posterior probability vector. For example, the neural network may be trained, prior to the generation of the posterior probability vector, with a set of training feature vectors that includes the expected event vectors. In some examples, each of the set of training feature vectors includes properties of spoken sub-word units associated with keywords or key phrases. The training feature vectors includes the properties of the expected event vectors such that training with the expected event vectors teaches the neural network the combination of properties to identify that correspond with each of the expected event vectors and the sub-word units of the keywords and key phrases.

In these examples, the neural network includes a low rank hidden input layer that is trained with the other layers in the neural network, e.g., with the same input, until the output of the neural network satisfies a threshold value, e.g., based on the accuracy of the output. In some examples, the neural network may be trained with a high rank hidden input layer, e.g., that includes a matrix A with dimensions i×o. A system may then create the low rank hidden input layer using the matrix A, e.g., may create the matrices B and C with dimensions i×r and r×o, respectively when r is the rank of the matrix A, and train the neural network with the low rank hidden input layer, e.g., using the same input or different input from that used to train the neural network with the high rank hidden input layer. In some examples, the system creates and trains the matrices B and C without creating or training the matrix A. In some implementations, the system creates the matrix A and uses the matrix A, without training the matrix A, to create the matrices B and C.

In some implementations, the set of training feature vectors comprises a plurality of general feature vectors where each of the general feature vectors is different from all of the expected event vectors and corresponds with words different from the keywords. For example, the general feature vectors include properties of sub-word units not included in any of the keywords or key phrases the acoustic modeling module identifies, e.g., general speech that does not include the keywords or key phrases. The neural network may use the general feature vectors to identify combinations of properties that are not associated with any of the expected event vectors, e.g., as negative training data. The negative training data may be associated with a filler category or posterior probability determined by the neural network.

Figure 7:
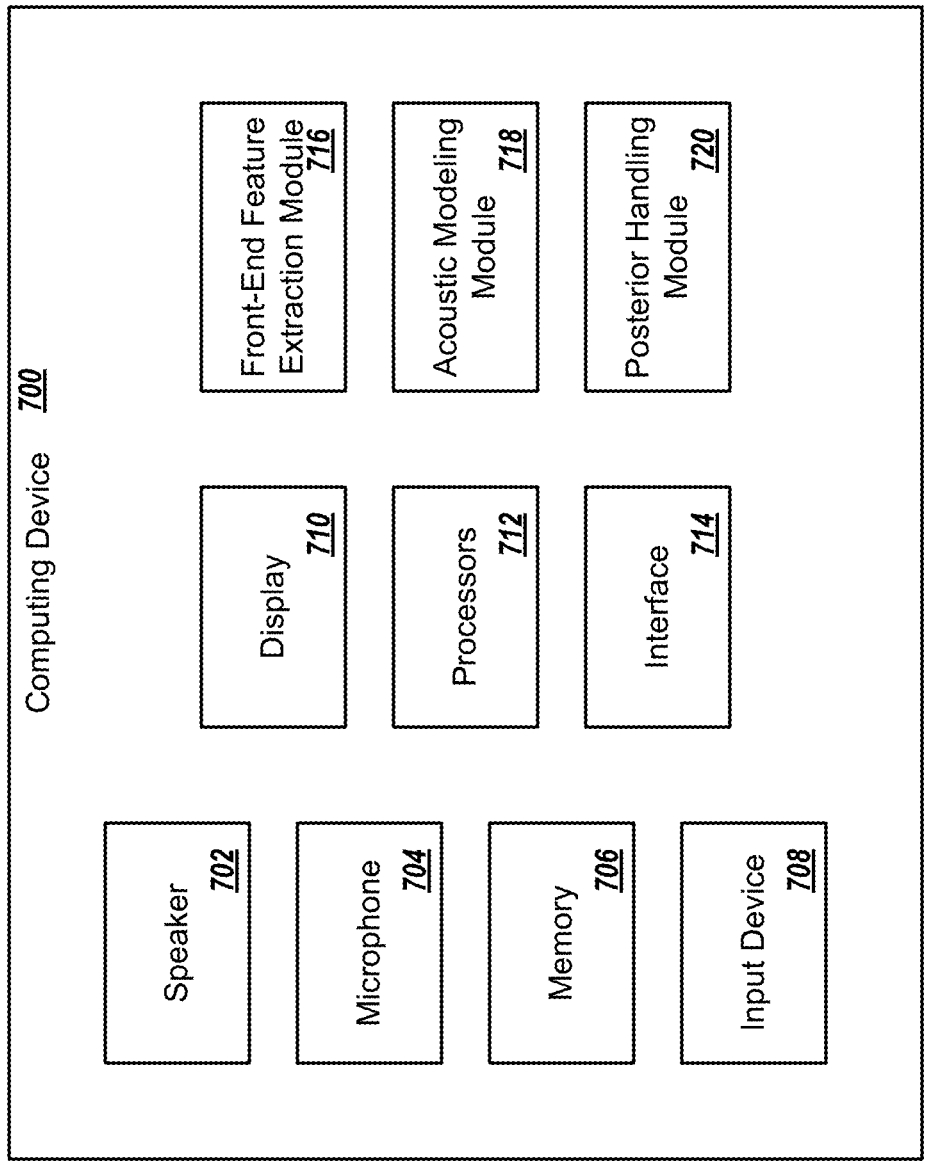
FIG. 7 is a block diagram of an example computing device that can detect keyword and key phrase utterances in an audio waveform.

FIG. 7 is a block diagram of an example computing device 700 that can detect keyword and key phrase utterances in an audio waveform. The computing device 700 contains a variety of constituent parts and modules that may be implemented through appropriate combinations of hardware, firmware, and software that allow the computing device 700 to function as an embodiment of appropriate features.

The computing device 700 contains one or more processors 712 that may include various hardware devices designed to process data. The processors 712 are communicatively coupled to other parts of computing device 700. For example, the processors 712 may be coupled to a speaker 702 and a microphone 704 that allow output and input of audio signals to and from an area that physically surrounds the computing device 700. The microphone 704 may provide the raw signals that capture aspects of the audio waveform 202 that are processed in other portions of the computing device 700.

The computing device 700 may include a memory 706. The memory 706 may include a variety of memory storage devices, such as persistent storage devices that allow permanent retention and storage of information manipulated by the processors 712.

An input device 708 allows the receipt of commands by the computing device 700 from a user, and an interface 714 allows computing device 700 to interact with other devices to allow the exchange of data. The processors 712 may be communicatively coupled to a display 710 that provides a graphical representation of information processed by the computing device 700 for the presentation to a user.

The processors 712 may be communicatively coupled to a series of modules that perform the functionalities necessary to implement the method of embodiments that is presented in FIG. 6. These modules include a front-end feature extraction module 716, which performs as described with reference to FIG. 3, an acoustic modeling module 718, which performs as described with reference to FIG. 4, and a posterior handling module 720, which performs as described with reference to FIG. 5.

The acoustic modeling module 718 may use a deep neural network, e.g., described with reference to FIG. 1 above. For instance, the deep neural network is specific to a particular set of keywords and key phrases and, for each input feature vector, outputs a posterior probability score vector with values for each of the keywords and key phrases.

As discussed above, the task of keyword detection is an important component in some speech recognition applications. For example, when the vocabulary size is limited, or when the task requires activating a device, for example, a phone, by saying a word, keyword detection is applied to classify whether an utterance contains a word or not and whether the word is a particular word or part of a phrase for which the device has been programmed to identify.

For example, the task performed by some embodiments includes detecting a single word, for example, "Google," that will activate a device from a standby mode to perform a task. The device continuously monitors received audio waveforms for the predetermined keywords and/or key phrases.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 8:
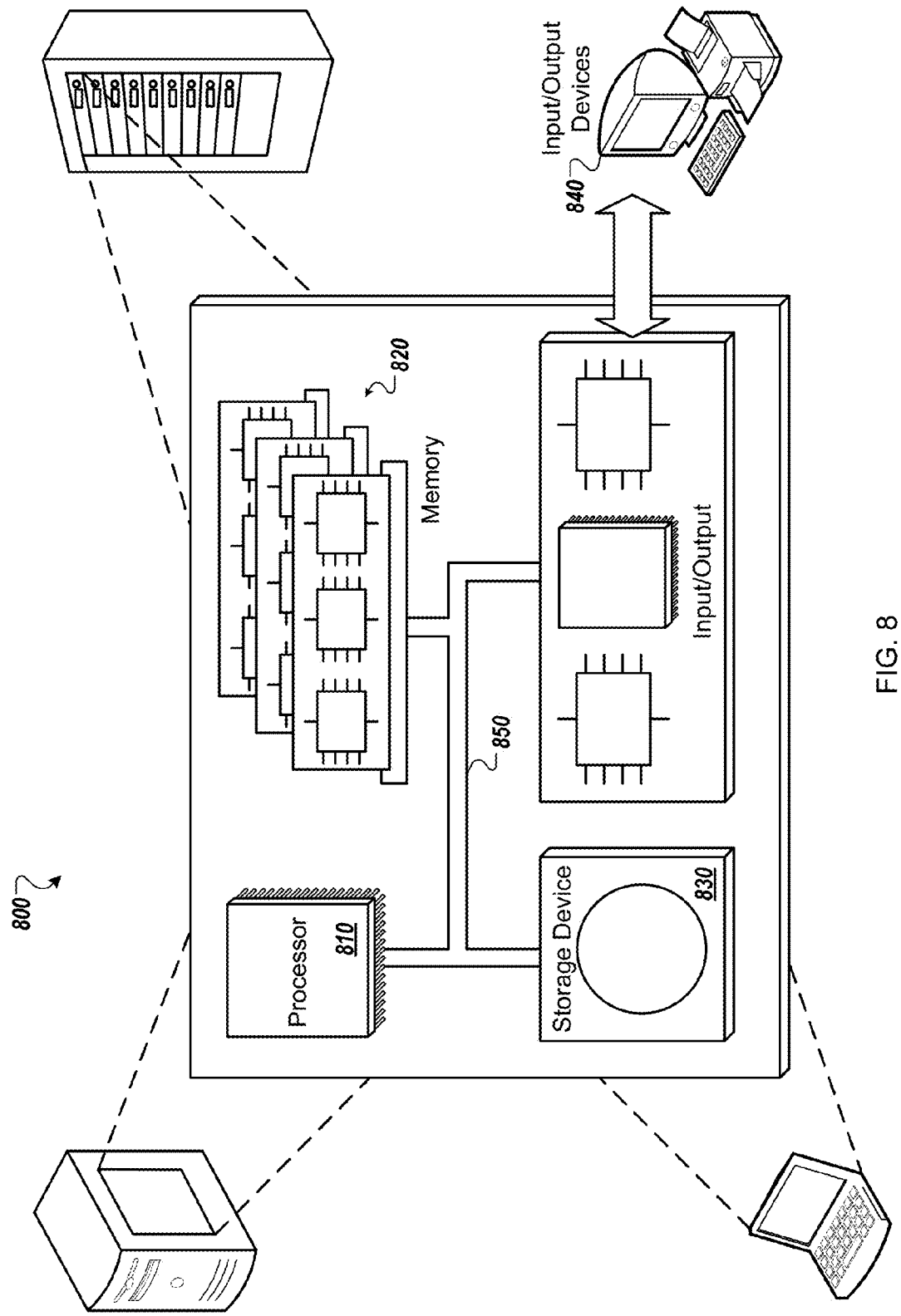
FIG. 8 is a block diagram of a computing system that can be used in connection with computer-implemented methods described in this document.

An example of one such type of computer is shown in FIG. 8, which shows a schematic diagram of a generic computer system 800. The system 800 can be used for the operations described in association with any of the computer-implement methods described previously, according to one implementation. The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard and/or pointing device. In another implementation, the input/output device 840 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for training a deep neural network that comprises a low rank hidden input layer with m nodes and an adjoining hidden layer with o nodes, the low rank hidden input layer comprising a first matrix A and a second matrix B with dimensions i×m and m×o, respectively, to identify a key phrase, the method comprising:
   receiving, by a speech recognition system that includes the deep neural network trained to identify the key phrase, a feature vector comprising i values that represent features of an audio signal encoding an utterance;
   determining, by the speech recognition system, an output vector comprising o values using the m nodes in the low rank hidden input layer by combining the feature vector, the first matrix A in the low rank hidden input layer, and the second matrix B included in the low rank hidden input layer using a linear function, wherein m is a smaller number than o;
   determining, by the speech recognition system using a non-linear function for the adjoining hidden layer that has the o nodes, another vector using the output vector that comprises the o values;
   determining, by the speech recognition system, a confidence score that indicates whether the utterance includes the key phrase using the other vector;
   adjusting, by the speech recognition system, one or more weights for the low rank hidden input layer based on an accuracy of the confidence score; and
   providing, by the speech recognition system, the deep neural network with the adjusted one or more weights for use in processing audio.

2. The method of claim 1 wherein adjusting the one or more weights for the low rank hidden input layer based on the accuracy of the confidence score comprises adjusting a greater quantity of the weights in the low rank hidden input layer when the accuracy does not satisfy a threshold accuracy than a smaller quantity of the weights that would be adjusted when the accuracy satisfies the threshold accuracy.

3. The method of claim 1 comprising:
   determining a posterior probability score using the other vector, wherein determining the confidence score using the other vector comprises determining the confidence score using the posterior probability score.

4. The method of claim 1 wherein providing the deep neural network with the adjusted one or more weights for use in processing audio comprises providing the deep neural network to a digital signal processor for processing audio signals.

5. The method of claim 1 wherein combining the feature vector, the first matrix A in the low rank hidden input layer, and the second matrix B included in the low rank hidden input layer using the linear function comprises combining, by the low rank hidden input layer using the m nodes in the low rank hidden input layer, the values of the first matrix A with the second matrix B using a weighted sum.

6. The method of claim 1 wherein determining, using the non-linear function, the other vector comprises determining the other vector using a rectified linear unit (ReLU) function.

7. A speech recognition system for training a deep neural network that comprises a low rank hidden input layer with m nodes and an adjoining hidden layer with o nodes, the low rank hidden input layer comprising a first matrix A and a second matrix B with dimensions i×m and m×o, respectively, to identify a key phrase, the speech recognition system comprising:
   one or more computers and one or more storage devices storing instructions that are operable, when executed by the one or more computers, to cause the one or more computers to perform operations comprising:
      receiving, by the speech recognition system that includes the deep neural network trained to identify the key phrase, a feature vector comprising i values that represent features of an audio signal encoding an utterance;
      determining an output vector comprising o values using the m nodes in the low rank hidden input layer by combining the feature vector, the first matrix A in the low rank hidden input layer, and the second matrix B included in the low rank hidden input layer using a linear function, wherein m is a smaller number than o;
      determining, using a non-linear function for the adjoining hidden layer that has the o nodes, another vector using the output vector that comprises the o values;
      determining a confidence score that indicates whether the utterance includes the key phrase using the other vector;
      adjusting one or more weights for the low rank hidden input layer based on an accuracy of the confidence score; and
      providing, by the speech recognition system, the deep neural network with the adjusted one or more weights for use in processing audio.

8. The speech recognition system of claim 7 wherein adjusting the one or more weights for the low rank hidden input layer based on the accuracy of the confidence score comprises adjusting a greater quantity of the weights in the low rank hidden input layer when the accuracy does not satisfy a threshold accuracy than a smaller quantity of the weights that would be adjusted when the accuracy satisfies the threshold accuracy.

9. The speech recognition system of claim 7 the operations comprising:
   determining a posterior probability score using the other vector, wherein determining the confidence score using the other vector comprises determining the confidence score using the posterior probability score.

10. The speech recognition system of claim 7 the operations wherein providing the deep neural network with the adjusted one or more weights for use in processing audio comprises providing the deep neural network to a digital signal processor for processing audio signals.

11. The speech recognition system of claim 7 wherein combining the feature vector, the first matrix A in the low rank hidden input layer, and the second matrix B included in the low rank hidden input layer using the linear function comprises combining, by the low rank hidden input layer using the m nodes in the low rank hidden input layer, the values of the first matrix A with the second matrix B using a weighted sum.

12. The speech recognition system of claim 7 wherein determining, using the non-linear function, the other vector comprises determining the other vector using a rectified linear unit (ReLU) function.

13. A non-transitory computer-readable medium for training a deep neural network that comprises a low rank hidden input layer with m nodes and an adjoining hidden layer with o nodes, the low rank hidden input layer comprising a first matrix A and a second matrix B with dimensions i×m and m×o, respectively, to identify a key phrase, the computer-readable medium storing software comprising instructions executable by a speech recognition system that includes one or more computers which, upon such execution, cause the one or more computers to perform operations comprising:
receiving, by the speech recognition system that includes the deep neural network trained to identify the key phrase, a feature vector comprising i values that represent features of an audio signal encoding an utterance;
determining an output vector comprising o values using the m nodes in the low rank hidden input layer by combining the feature vector, the first matrix A in the low rank hidden input layer, and the second matrix B included in the low rank hidden input layer using a linear function, wherein m is a smaller number than o;
determining, using a non-linear function for the adjoining hidden layer that has the o nodes, another vector using the output vector that comprises the o values;
determining a confidence score that indicates whether the utterance includes the key phrase using the other vector;
adjusting one or more weights for the low rank hidden input layer based on an accuracy of the confidence score; and
providing, by the speech recognition system, the deep neural network with the adjusted one or more weights for use in processing audio.

14. The computer-readable medium of claim 13 wherein adjusting the one or more weights for the low rank hidden input layer based on the accuracy of the confidence score comprises adjusting a greater quantity of the weights in the low rank hidden input layer when the accuracy does not satisfy a threshold accuracy than a smaller quantity of the weights that would be adjusted when the accuracy satisfies the threshold accuracy.

15. The computer-readable medium of claim 13 the operations wherein providing the deep neural network with the adjusted one or more weights for use in processing audio comprises providing the deep neural network to a digital signal processor for processing audio signals.

16. The computer-readable medium of claim 13 the operations comprising:
determining a posterior probability score using the other vector, wherein determining the confidence score using the other vector comprises determining the confidence score using the posterior probability score.

17. The computer-readable medium of claim 13 wherein combining the feature vector, the first matrix A in the low rank hidden input layer, and the second matrix B included in the low rank hidden input layer using the linear function comprises combining, by the low rank hidden input layer using the m nodes in the low rank hidden input layer, the values of the first matrix A with the second matrix B using a weighted sum.

18. The computer-readable medium of claim 13 wherein determining, using the non-linear function, the other vector comprises determining the other vector using a rectified linear unit (ReLU) function.

\* \* \* \* \*